May 21, 1940.   E. H. CHRISTENSEN   2,201,660
IMPLEMENT HITCH
Filed Dec. 6, 1939
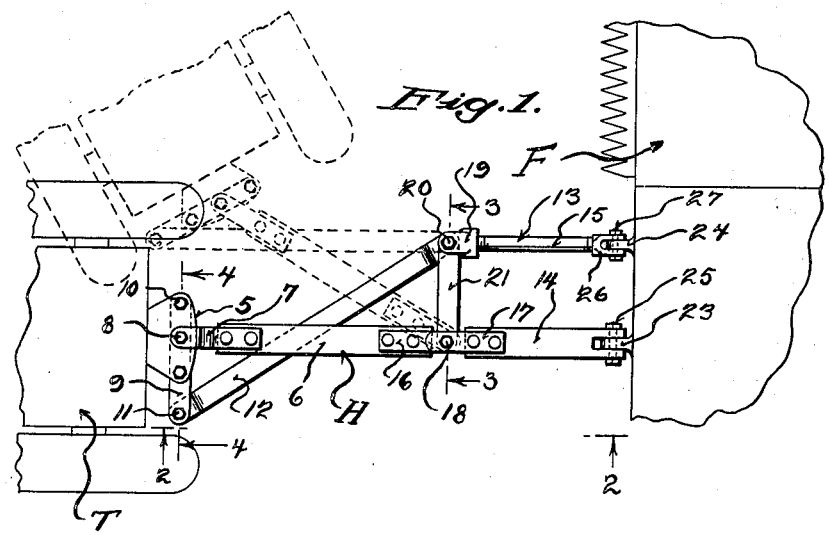
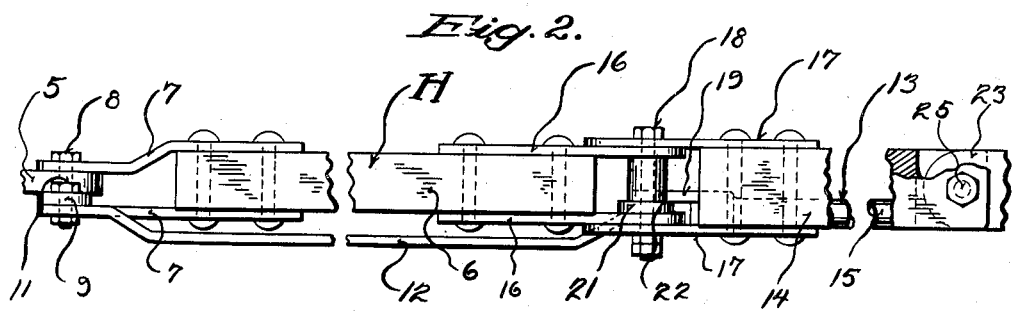
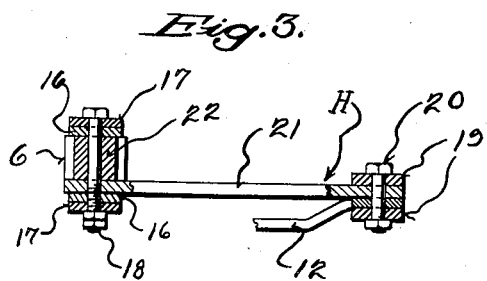
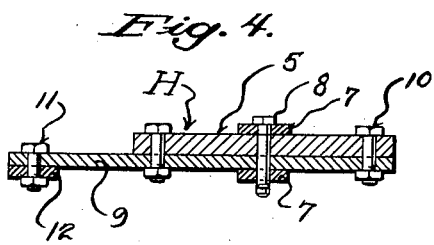
Inventor
E. H. Christensen
By
Attorneys Patented May 21, 1940

2,201,660

UNITED STATES PATENT OFFICE 2,201,660

IMPLEMENT HITCH

Edward H. Christensen, Oshkosh, Wis.

Application December 6, 1939, Serial No. 307,858

4 Claims. (Cl. 280—33.5)

This invention appertains to hitches, and more particularly to a novel means for connecting farm implements and machines to the motivating unit, such as a tractor.

One of the primary objects of my invention is the provision of an implement hitch which will effectively permit the drawing of heavy farm implements and machines in rear of a tractor and permit square or ninety-degree turns of the implement, thereby saving crops by eliminating wasteful stands at the corners or ends of the fields.

Another salient object of my invention is to provide an implement hitch of a compact and durable construction, which will allow short turns of the farm implement or machine, without fouling or interfering with the tractor.

A further object of my invention is to provide a hitch embodying a main pull tongue and a cross link for connection with the tractor drawbar and an implement connection of a substantially parallelogram form for pivotally supporting the link and pull tongue in advance of the farm implement.

With these and other objects in view, the invention consists in the novel construction, arrangement, and formation of parts, as will be hereinafter more specifically described, claimed, and illustrated in the accompanying drawing, in which drawing:

Figure 1 is a fragmentary, top, plan view showing my improved hitch for connecting a farm implement machine with a tractor, the view also showing in dotted lines the position of parts of the hitch during the making of a short turn.

Figure 2 is an enlarged, side, elevational view of my hitch.

Figure 3 is a transverse, sectional view through my hitch, taken on the line 3—3 of Figure 1, looking in the direction of the arrows.

Figure 4 is a transverse, sectional view taken on the line 4—4 of Figure 1, looking in the direction of the arrows.

Referring to the drawing in detail, wherein similar reference characters designate corresponding parts throughout the several views, the letter H generally indicates my novel hitch for connecting a farm implement or machine F with a tractor T.

The farm implement or machine can be considered as a mower, a corn harvester, a combined mower and thresher, or the like, and it is to be understood that the hitch H can be utilized for pulling any desired type of farm implement or machine.

The tractor T can also be of any preferred character, size, or make, and includes a drawbar 5.

My novel hitch H includes a main pull beam or tongue 6, and the forward end of the tongue carries a yoke 7 for straddling the drawbar 5 of the tractor, and the yoke of the tongue is adapted to be connected to the drawbar by means of a pivot bolt 8. In accordance with my invention, it will be necessary to provide the drawbar 5 with a lateral extension, which may consist of a rigid bar 9. This bar is rigidly bolted in two places, as at 10, to the drawbar 5, and, as is clearly shown in Figure 4, the pivot bolt 8 for the tongue can also pass through the drawbar extension 9. The outer end of the drawbar extension 9 has pivotally connected thereto by means of a pivot bolt 11, a draft link 12. The rear ends of the tongue 6 and the draft link 12 are connected to the farm implement F by a novel hitch extension 13, which forms a part of the hitch.

This hitch extension 13 includes spaced, parallel bars 14 and 15, and the bar 14, in effect, forms a continuation of the pull tongue 6 and lies in the same longitudinal plane therewith. The adjacent ends of the tongue 6 and the extension bar 14 are provided with yokes 16 and 17, respectively, which are, in turn, pivotally connected by a king bolt 18. This permits swinging of the pull tongue 6 in a horizontal plane. The forward end of the bar 15 has mounted thereon a head or socket 19, which is pivotally connected to the rear end of the draft link 12 by means of a pivot bolt 20.

The forward ends of the spaced, parallel bars 14 and 15 are held in their proper spaced relation by a cross link 21, and this link 21 is secured in place by the king bolt 18 and the pivot bolt 20. If desired, the king bolt 18 can have placed thereon a spacer sleeve 22 for holding the yoke 16 and 17 in proper spaced relation.

The rear ends of the parallel bars 14 and 15 are, in turn, connected to the farm implement to be drawn for swinging movement in a vertical plane, and this can be accomplished in various manners. As illustrated, the farm implement has connected directly thereto or to the clevis head thereof, forwardly extending, spaced, parallel pivot ears 23 and 24. The rear end of the bar 14 is bifurcated to straddle the ear 23, and a horizontal pivot bolt 25 connects said bar 14 with the pivot ear. The rear end of the bar 15 carries a yoke 26, which receives the ear 24, and the yoke 26 and the ear 24 are pivotally connected by a horizontally disposed bolt 27. If preferred, the bar 15 can be united with the head or socket 19 and the yoke 26 by threads, whereby the active length of the bar 15 can be adjusted within certain limits.

By referring to Figure 1, it can be seen that the relatively heavy tongue or pole 6 and its extension 14 carry the greatest draft or pull, while the draft link 12 cooperates with the tongue to permit the desired tracking of the farm implement F in rear of the tractor and to allow the square or short turns to be had.

The points 18, 20, 27, and 25 form substantially a parallelogram, which spaces the main part of the hitch forwardly of the farm implement and allows the desired short turns to be made without the fouling of the implement with the tractor. This also permits the effective, short, compact hitch structure to be had. Likewise, by referring to Figure 1, it can be seen that the tractor is allowed to turn initially without transmitting any stress to the farm implement, but that upon continuing turn of the tractor, the farm implement will be swung around therewith.

While I have shown the hitch for a right cut, it is possible to reverse the arrangement and obtain a left cut. In other words, it is merely necessary to turn the hitch over in order to obtain the desired left cut.

Changes in details may be made without departing from the spirit or the scope of my invention, but what I claim as new is:

1. The combination with a farm implement and a pulling tractor therefor having a drawbar, of a hitch for connecting the farm implement to the tractor including spaced, parallel bars connected to the implement for swinging movement in a vertical plane, a cross bar connecting the parallel bars together for preventing independent movement thereof, a pull tongue pivotally connected to one of the parallel bars for swinging movement in a horizontal plane and pivotally connected to the drawbar, and a draft link extending across and pivotally connected to the other parallel bar.

2. The combination with a farm implement and a pulling tractor therefor having a drawbar, of a hitch for connecting the farm implement with the tractor including a pull tongue and a cross draft link pivotally connected at their forward ends at spaced points to the drawbar, a pair of spaced parallel bars pivotally connected to the farm implement for swinging movement in a vertical plane, means connecting the parallel bars together, and means pivotally connecting the rear ends of the pull tongue and cross draft link to the forward ends of the parallel bars.

3. The combination with a farm implement and a pulling tractor having a drawbar, of a hitch for connecting the farm implement with the tractor including an extension member rigidly secured to the drawbar and extending laterally from one side thereof, a pull tongue pivotally secured to the drawbar for swinging movement in a horizontal plane, a cross draft link pivotally secured to the extension member of the drawbar, spaced, parallel bars pivotally coupled with the farm implement for swinging movement in a vertical plane, pivot yokes rigidly secured to the adjacent ends of the pull tongue and one of the drawbars, a king bolt connecting the yokes together, one of the mentioned bars and the pull tongue being in longitudinal alinement, means pivotally connecting the rear end of the cross draft link to the forward end of the other parallel bar, and a spacer bar connecting the parallel bars.

4. An implement hitch comprising, a pull tongue including a front section and a rear section, means pivotally connecting the sections together for swinging movement in a horizontal plane, means carried by the forward end of the tongue for pivotal connection with the drawbar of a tractor, a diagonally extending draft link, means for pivotally connecting the draft link to the drawbar of a tractor in spaced relation to the tongue, a pull bar arranged in spaced parallel relation to the rear section of the tongue, means pivotally connecting said bar to the draft link, means holding the bar in spaced relation to the tongue, and means pivotally connecting the rear end of the tongue and the last-mentioned bar to a farm implement for swinging movement in a vertical plane.

EDWARD H. CHRISTENSEN.